United States Patent
Kaneta et al.

(10) Patent No.: US 7,121,305 B2
(45) Date of Patent: Oct. 17, 2006

(54) METHOD FOR LINING AN EXISTING PIPE AND COLLAR FOR PROTECTING A LINING MATERIAL

(75) Inventors: Koji Kaneta, Hiratsuka (JP); Takao Kamiyama, Hiratsuka (JP); Kenji Fujii, Hiratsuka (JP); Takeshi Hasegawa, Hiratsuka (JP)

(73) Assignee: Shonan-Gosei-Jushi Seisakusho K.K., (JP)

( * ) Notice: Subject to any disclaimer, the term of this patent is extended or adjusted under 35 U.S.C. 154(b) by 0 days.

(21) Appl. No.: 11/150,582

(22) Filed: Jun. 10, 2005

(65) Prior Publication Data
US 2006/0005893 A1    Jan. 12, 2006

(30) Foreign Application Priority Data
Jul. 7, 2004    (JP)    ............................. 2004-200224

(51) Int. Cl.
*F16L 55/16*    (2006.01)
(52) U.S. Cl. ........................................ 138/98; 138/109
(58) Field of Classification Search .................. 138/97, 138/98, 109
See application file for complete search history.

(56) References Cited

U.S. PATENT DOCUMENTS

| 3,228,096 | A | * | 1/1966 | Albro | ...................... 29/890.15 |
| 3,615,984 | A | * | 10/1971 | Chase | .......................... 156/94 |
| 5,765,597 | A | * | 6/1998 | Kiest et al. | ................... 138/98 |
| 6,105,619 | A | * | 8/2000 | Kiest, Jr. | ...................... 138/98 |

* cited by examiner

*Primary Examiner*—James Hook
(74) *Attorney, Agent, or Firm*—Adams & Wilks (57) ABSTRACT

A method for lining an existing pipe uses a tubular lining material comprising a flexible resin absorber impregnated therein with a liquid setting resin. One end part of the lining material is radially spread to form cut pieces. The cut pieces of the lining material are laid on a flange comprising a flexible resin absorber impregnated with a liquid setting resin. The flange and the cut pieces of the lining material are brought into pressure contact with a surface surrounding a pipe opening of the existing pipe before a step of evertedly inserting the lining material into the existing pipe. The liquid setting resin in the flange and the cut pieces of the lining material is cured to adhesively fix the flange and the cut pieces of the lining material to the surface surrounding the pipe opening of the existing pipe.

18 Claims, 5 Drawing Sheets

METHOD FOR LINING AN EXISTING PIPE AND COLLAR FOR PROTECTING A LINING MATERIAL

BACKGROUND OF THE INVENTION

1. Field of the Invention

The present invention relates to a method for lining an inner circumferential surface of an existing pipe such as a sewer pipe with a lining material, and to a lining material collar for protecting one end part of the lining material.

2. Description of the Prior Art

In a conventional method of lining an existing pipe, as disclosed in Japanese Patent Publication No. 1980-43890, a lining material comprising a tubular (bag shaped) flexible resin absorber impregnated with a liquid setting resin is inserted into the existing pipe with the liquid setting resin in an uncured form. The lining material is then brought into pressure contact with an inner circumferential surface of the existing pipe by air pressure, water pressure, and the like, and cured by heating and hardening the setting material so that it becomes tubular with a shape the same as the inner circumferential surface of the existing pipe.

In such a lining method, if, for example, a branch pipe that intersects the main pipe and whose diameter is comparatively small is lined from a pipe opening of the branch pipe opened at a portion that intersects the main pipe, then a lining material is used that is provided with a flange at one end part, and that flange is bonded and fixed to the inner circumferential surface of the main pipe (hereinafter, referred to as the flange fixing surface) surrounding the pipe opening of the branch pipe. This is to position and fix one end part of the lining material to the pipe opening, and to prevent the infiltration of external ground water, rainwater, and the like, by sealing a gap between the inner circumference of the branch pipe and the outer circumference of the lining material at the circumferential edge part of the pipe opening of the branch pipe.

The flange comprises a resin absorber impregnated with a liquid setting resin; however, unlike the branch pipe lining material, the flange is manufactured as a hardened object by curing the impregnated liquid setting resin in advance at the factory, and carried into the construction site for use in a state integrally joined with one end part of the lining material.

To make the abovementioned seal perfect by tightly sealing the entire surface of the flange to the flange fixing surface, it is necessary to make the shape of the flange curved corresponding to the flange fixing surface, and to match the angle of the flange surface relative to the axial direction of the branch pipe liner to the angle of intersection of the main pipe with the branch pipe. Consequently, the angle of intersection of the main pipe with the branch pipe, and the shape (curvature, and the like) of the flange fixing surface are measured beforehand by performing a pre-examination of the lining construction. According to the dimensions thus measured, the flange is manufactured as a hardened object whose shape is matched to the measured shape, and the flange is joined to one end part of the lining material so that it forms the measured angle of intersection.

If, after lining the branch pipe, the main pipe is lined including the portion that intersects with the branch pipe, then the lining material of the main pipe unfortunately plugs up the pipe opening of the branch pipe at the intersecting portion. This requires the forming of a hole by a drill and the like in the lining material of the main pipe at the portion opposing the pipe opening of the branch pipe. In this case, a short, tubular collar provided with a flange of a metal such as stainless steel is used to protect the flange and the end part of the branch pipe liner from being cut by the drill. The tubular part of the collar is mated with one end part of a branch pipe lining material beforehand, and the collar is fixed by tightly sealing and bonding its flange to the lower surface of the flange of the lining material. Even with the manufacture of this collar, the angle of the tubular part of the collar with its flange is matched to the angle of intersection of the main pipe with the branch pipe, measured by the previously discussed pre-examination.

Nevertheless, it may not necessarily be possible to accurately measure the angle of intersection of the main pipe with the branch pipe, and the shape of the flange fixing surface by the previously performed pre-examination. In particular, accurate measurement is problematic in cases where a person cannot enter the main pipe and perform a direct measurement because the diameter of the main pipe is small, and the measurement must be taken indirectly by a video camera vehicle, and the like.

The flange of the lining material is conventionally manufactured as a hardened object whose shape matches the shape of the measurement results, and joined to one end part of the lining material at an angle the same as the angle of intersection of the measurement results. If, therefore, the measurement error is large, then the flange of the lining material can no longer be tightly sealed and fixed to the entire surface of the flange fixing surface. In this case, the gap between the inner circumference of the branch pipe and the outer circumference of the branch pipe liner at the circumferential edge part of the pipe opening of the branch pipe can no longer be completely sealed by the flange, and the infiltration of external ground water, rainwater, and the like, can no longer be prevented.

In addition, the previously mentioned collar is fixed to one end part of the lining material according to the measurement results. If, therefore, the measurement error is large, then the flange of the lining material can no longer be tightly sealed to the entire surface of the flange fixing surface.

It is therefore an object of the invention to provide a method for lining an existing pipe that can completely seal a gap between the inner circumference of the existing pipe and the outer circumference of the lining material at a circumferential edge part of the pipe opening of the existing pipe, and a lining material protecting collar adapted for use in this method.

SUMMARY OF THE INVENTION

The invention provides a method for lining an existing pipe using a tubular lining material comprising a flexible resin absorber impregnated therein with a liquid setting resin, the method comprising the steps of:

radially spreading one end part of the lining material to form a plurality of cut pieces;

laying the cut pieces of the lining material on a flange comprising a flexible resin absorber impregnated with a liquid setting resin;

bringing the flange and the cut pieces of the lining material into pressure contact with a surface surrounding the pipe opening of the existing pipe before the lining material is evertedly inserted into the existing pipe; and curing the liquid setting resin in the flange and the cut pieces to adhesively fix them to the surface surrounding the pipe opening of the existing pipe.

According to the invention, the flange can be made into a shape corresponding to the surface surrounding the pipe opening of the existing pipe, and the angle of the flange surface relative to the axial direction of the inserted lining material can be made to match the angle of intersection of the existing pipe and the flange mounting surface. This assures that the flange can completely seal the gap between the inner circumference of the existing pipe and the outer circumference of the lining material at the circumferential edge part of the pipe opening of the existing pipe and the infiltration of external ground water, rainwater, and the like can be reliably prevented.

According to the invention, a collar is provided which comprises a short tube part mated to one end part of the lining material, and a flange part formed at one end part of the tube part and stacked with and fixed to the flange. The portion outside of the end part of the tube part on the flange part side is made elastically deformable.

Further features of the invention, its nature and various advantages will be more apparent from the accompanying drawings and following detailed description of the invention.

DETAILED DESCRIPTION OF THE PREFERRED EMBODIMENTS

The present invention will be described based on preferred embodiments, referring to the attached drawings.

Figure 2:
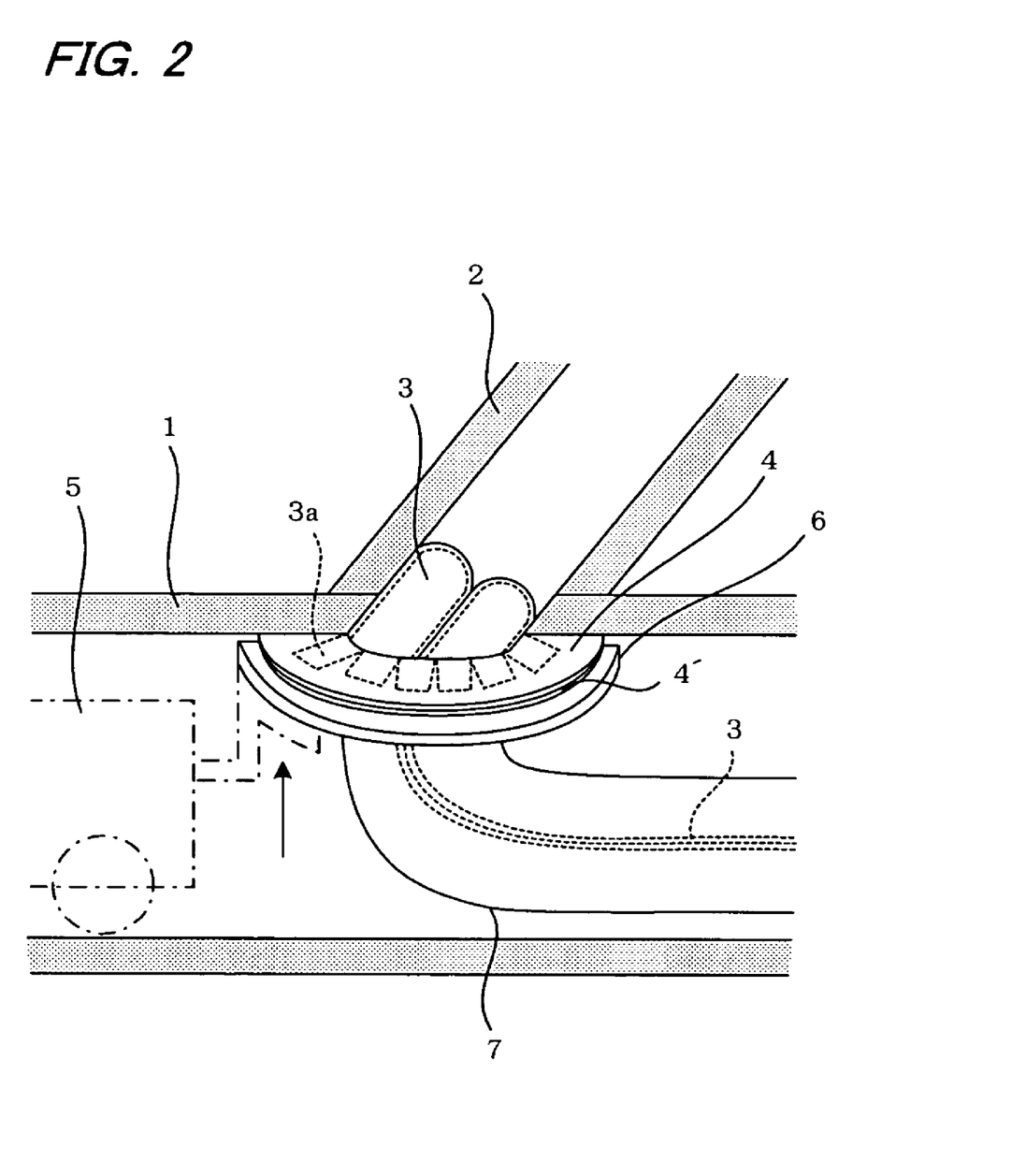
FIG. 2 is a side view of the inside of the main pipe and the branch pipe shown in a state wherein the everted insertion has started for the lining material from the pipe opening of the branch pipe in the first embodiment.
Figure 3:
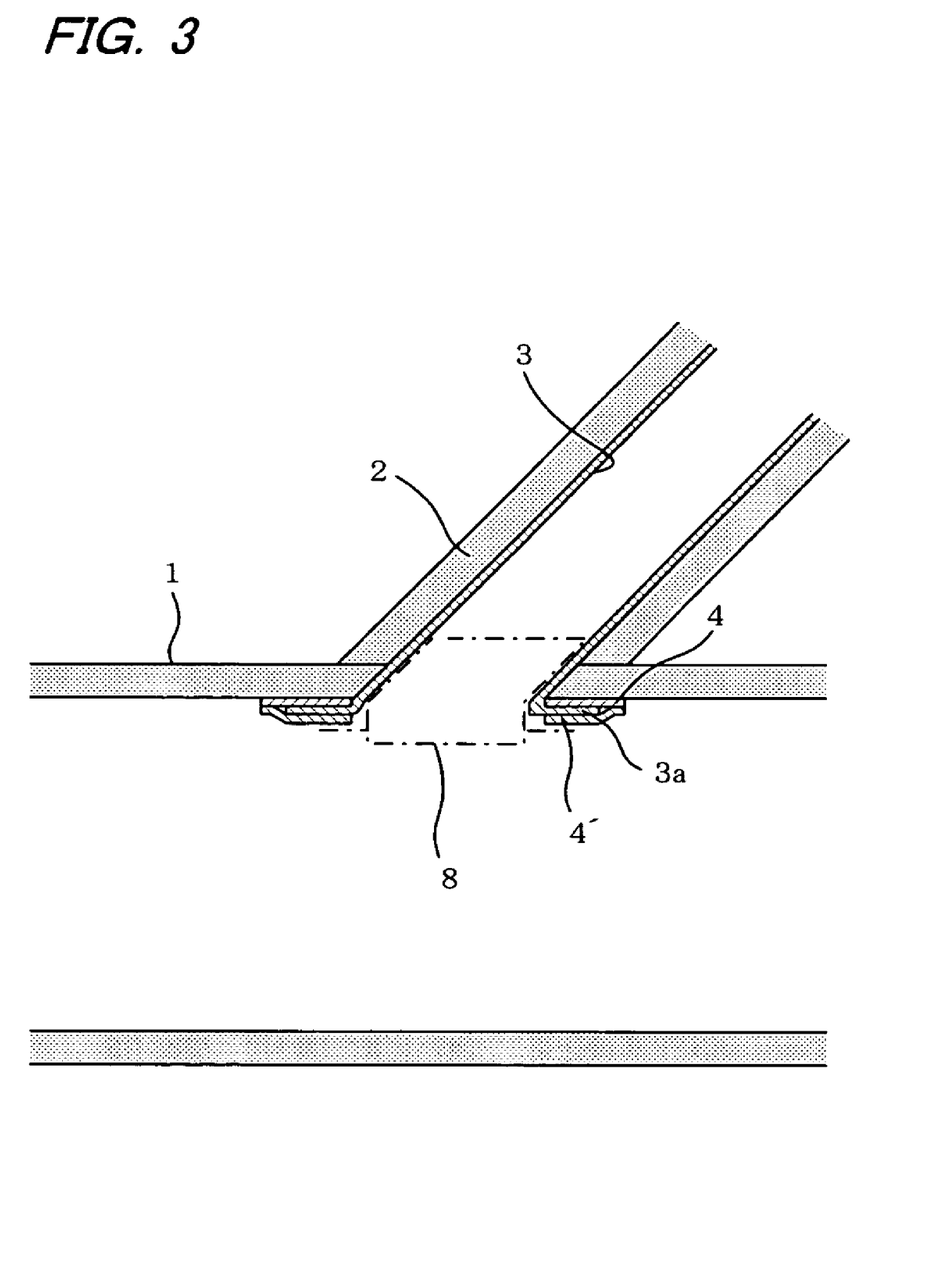
FIG. 3 is a cross sectional view showing a state wherein the lining of the branch pipe in the first embodiment has been completed.

According to an embodiment shown in FIG. 2 and FIG. 3, an inner circumferential surface of a branch pipe 2 is lined from the pipe opening of the branch pipe 2 that intersects with a main pipe 1 such as a sewer pipe at an angle of approximately 45 degrees. The main pipe 1 and the branch pipe 2 are both circular pipes. In the pre-examination, measurements are previously performed with respect to the angle of intersection of the main pipe 1 with the branch pipe 2, more precisely the angle of the branch pipe 2 in an axial direction relative to the flange fixing surface (the axial direction of the main pipe 1) and with respect to the shape (curvature, and the like) of the flange fixing surface and the shape of the pipe opening, and the like.

Figure 1:
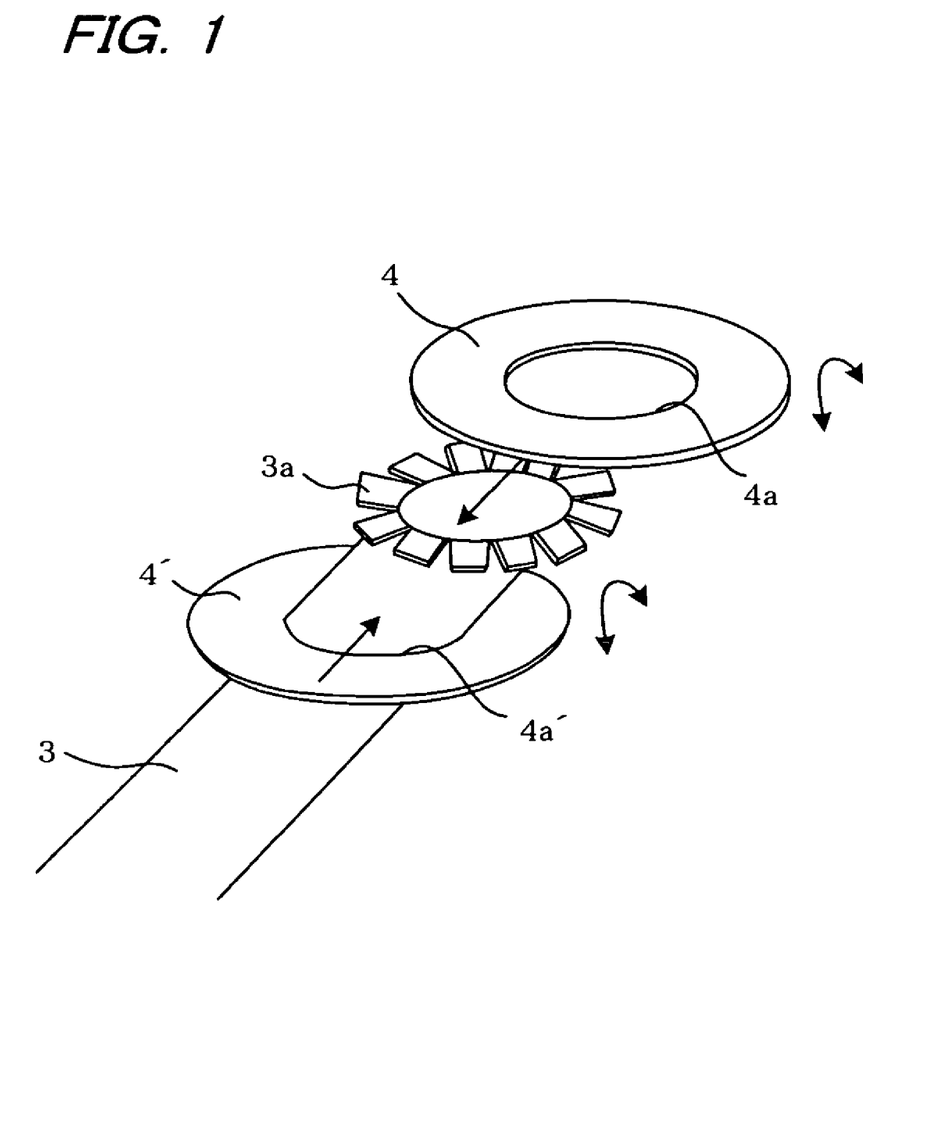
FIG. 1 is a perspective view showing how the end part of a branch pipe lining material is joined to flanges in the first embodiment of the present invention.

FIG. 1 shows the appearance of a liner or lining material 3 used in the present embodiment, and two flanges 4, 4' joined to one end part thereof. The lining material 3 and the flanges 4, 4' are formed as separate units, and are joined at the lining construction site, as discussed later.

The lining material 3 comprises a flexible, sheet shaped resin absorber (comprising a nonwoven fabric made of polyester fibers and the like) impregnated with a liquid setting resin, such as an unsaturated polyester resin, a vinyl ester resin, or an epoxy resin, and is formed in a tubular shape (bag shape) having an outer diameter corresponding to the inner diameter of the branch pipe 2; although shown as a tubular shape in FIG. 1, the lining material 3 is carried to the lining construction site in a form folded in strips with the impregnated liquid setting resin not yet cured and entirely flexible, and a plastic film, such as polyethylene, is affixed to the surface of the lining material 3, although not shown in detail.

At the factory, before carrying this lining material 3 into the construction site, one end part of the lining material 3, to which the flanges 4, 4' are joined as discussed later, is radially expanded as illustrated to form a plurality of cut pieces 3a. Furthermore, before forming these cut pieces 3a, one end part of the lining material 3 is cut at a cutting plane inclined at an angle corresponding to the angle of intersection of the main pipe 1 with the branch pipe 2 measured by the pre-examination with respect to the axial direction of that one end part of the lining material 3, and, moreover, a plurality of cuts is made in the one end part along the length direction of the lining material 3, which is spread radially to form the cut pieces 3a. In addition, the shape of the edge of the opening of the one end part at which the cut pieces 3a of the lining material 3 are formed is shown as a simple elliptical shape in FIG. 1, but is actually formed so that the elliptical shape is curved to match the shape of the edge of the pipe opening of the branch pipe 2 measured by the pre-examination. Furthermore, it may also be possible to cut one end part of the lining material 3 and to form the cut pieces 3a at the construction site.

The flanges 4, 4' are made of a flexible, sheet shaped resin absorber impregnated with a liquid setting resin, the same as the lining material 3, and are formed in a circular or elliptical shape wherein are formed holes 4a, 4a' whose diameters at the center correspond to the outer diameter of the lining material 3 when tubularly formed. In FIG. 1, the flanges 4, 4' are shown to be flat, but, in the state when they are fixed to the flange fixing surface of the inner circumference of the main pipe 1, they are curved in accordance with the curvature of the flange fixing surface, as shown by the arrows. These flanges 4, 4' are also provided at the construction site in a state wherein the impregnated liquid setting resin is uncured, and entirely flexible.

The following explains how the branch pipe 2 is lined using the lining material 3 and the flanges 4, 4'.

The lining material 3 is provided at the construction site in a state wherein it is contained in a pressure bag 7 (refer to FIG. 2) for applying air pressure or water pressure thereto. One end part of that lining material 3 with the cut pieces 3a is passed through the hole 4a' of the flange 4' and each of the plurality of cut pieces 3a that was spread radially is inserted between the flanges 4, 4'. The flanges 4, 4' and the cut pieces 3a are then vertically stacked and, as shown in FIG. 2, set on a pipe opening attachment 6 attached to an intra-pipe working robot 5, and the pressure bag 7 is connected to the attachment 6.

The intra-pipe working robot 5 is equipped with a video camera (not illustrated) that captures an image, such as the status of the work inside the main pipe 1, and is also equipped with a lift mechanism (not illustrated) that lifts the pipe opening attachment 6. The pipe opening attachment 6 is circularly or elliptically plate shaped, having a hole (not illustrated) through which the lining material 3 passes through the center, and is therefore formed in a shape corresponding to the previously measured flange fixing surface and curvedly formed with a curvature corresponding to the flange fixing surface.

The intra-pipe working robot 5 is moved by a winch (not illustrated) by remote control while verifying the position of the pipe opening of the branch pipe 2 based on the image from the video camera, and the holes 4a, 4a' of the flanges 4, 4' on the attachment 6 are moved to a position directly below the pipe opening of the branch pipe 2.

Next, the pipe opening attachment 6 is lifted, as shown by the arrow, by driving the abovementioned lift mechanism, and the stacked flanges 4, 4', wherein the cut pieces 3a of the lining material 3 are interposed, are brought into pressure contact with the flange fixing surface surrounding the pipe opening of the branch pipe 2.

Next, air pressure or water pressure is applied inside the pressure bag 7 to cause the lining material 3 to be inserted. The lining material 3 is inserted into the branch pipe 2 from the pipe opening of the branch pipe 2 while sequentially being everted by this pressure from the end part on the cut pieces 3a side. When this everted insertion has finished across the entire length of the lining material 3, air pressure is further applied inside the lining material 3 to bring the lining material 3 into pressure contact with the inner circumferential surface of the branch pipe 2, and the liquid setting resin impregnated in the lining material 3 is heated by injecting hot water inside the lining material 3 in a state wherein it is made into a tubular shape corresponding to the shape of that inner circumferential surface, thereby causing the lining material 3 to be cured in the abovementioned tubular shape.

The heat at this time also heats and cures the liquid setting resin impregnated in the flanges 4, 4', and in the cut pieces 3a of the lining material 3. At this time, the flange 4 and the flange fixing surface are bonded and fixed by the cured liquid setting resin. In addition, the flanges 4, 4', wherein the cut pieces 3a are interposed, are mutually bonded and integrated, and, by bonding to the cut pieces 3a, are integrally joined to the end part of the lining material 3 on the cut pieces 3a side. It may be acceptable to accessorily provide the pipe opening attachment 6 with a heater (not illustrated) that heats and cures the liquid setting resin of the flanges 4, 4' and the cut pieces 3a. After heating and curing the liquid setting resin in this manner, finishing and the like is performed on the end parts of the lining material 3 on the cut pieces 3a side and the opposite side, thereby completing the lining of the branch pipe 2. A cross sectional view of this state is depicted in FIG. 3.

According to the lining method of the present embodiment, flexible flanges 4, 4', wherein the flexible cut pieces 3a are interposed, are brought into pressure contact with and tightly sealed to the flange fixing surface with the liquid setting resin in an uncured state, and the flanges 4, 4' and the lining material 3 are cured as is by heating and curing the liquid setting resin in a state wherein the flexible lining material 3 is brought into pressure contact with and tightly sealed to the inner circumferential surface of the branch pipe 2, i.e., in the state wherein the angle formed by the flanges 4, 4' and the end part of the lining material 3 on the cut pieces 3a side matches the angle of intersection of the main pipe 1 with the branch pipe 2, and therefore the angle formed by the flanges 4, 4' and the end part of the lining material 3 after hardening also matches, as is, the angle of intersection of the main pipe 1 with the branch pipe 2. In addition, in the state wherein the liquid setting resin is uncured and is itself flexible, the flanges 4, 4' are shaped corresponding to the flange fixing surface by bringing them into pressure contact with the entire flange fixing surface. The liquid setting resin is then heated and cured from that state, thereby becoming a hardened object whose shape corresponds to the flange fixing surface.

Accordingly, even if there is some error in the measurement results in the pre-examination, the flanges 4, 4' can be tightly sealed and fixed to the entire surface of the flange fixing surface, thereby enabling the complete sealing by the flanges 4, 4' of the gap between the inner circumference of the branch pipe 2 and the outer circumference of the lining material 3 at the circumferential edge part of the pipe opening of the branch pipe 2, and enabling the reliable prevention of infiltration of external ground water, rainwater, and the like.

Furthermore, it is acceptable prior to the everted insertion of the lining material 3 in the branch pipe 2 to heat and cure the liquid setting resin impregnated in the cut pieces 3a and the flanges 4, 4' that have been brought into pressure contact with the flange fixing surface. However, to make the angle formed by the flanges 4, 4' and the end part of the lining material 3 accurately match the angle of intersection of the main pipe 1 with the branch pipe 2, it is preferable to heat and cure the liquid setting resin of the flanges and the cut pieces of the lining material 3 at the same time when the lining material 3 inserted into the branch pipe is cured.

In the lining work discussed above, if the main pipe 1, including the intersecting portion of the branch pipe 2, is lined after lining the branch pipe 2, then a collar for protecting the lining material is fixed to the end part of the lining material 3 on the flanges 4, 4' side when lining the branch pipe 2.

Figure 4A:
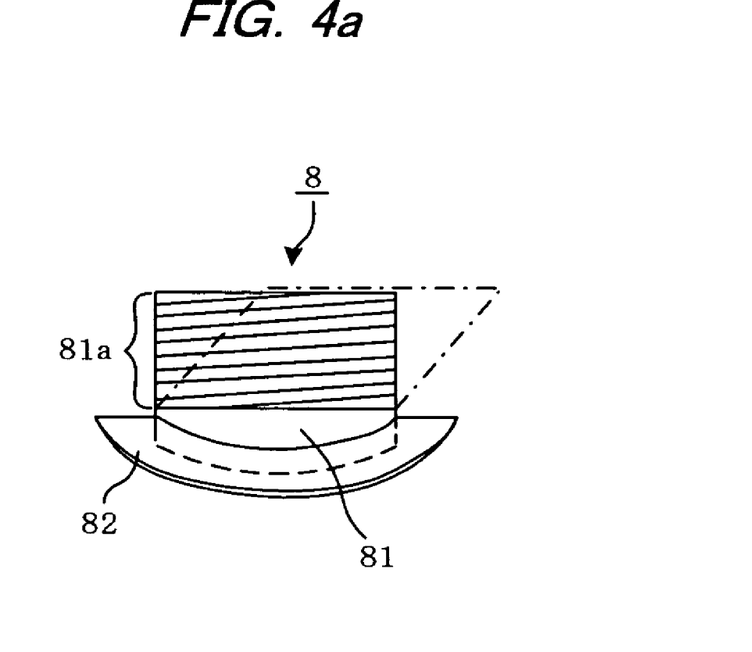
FIG. 4a is a side view showing the structure of a collar for the lining material used in the second embodiment.
Figure 4B:
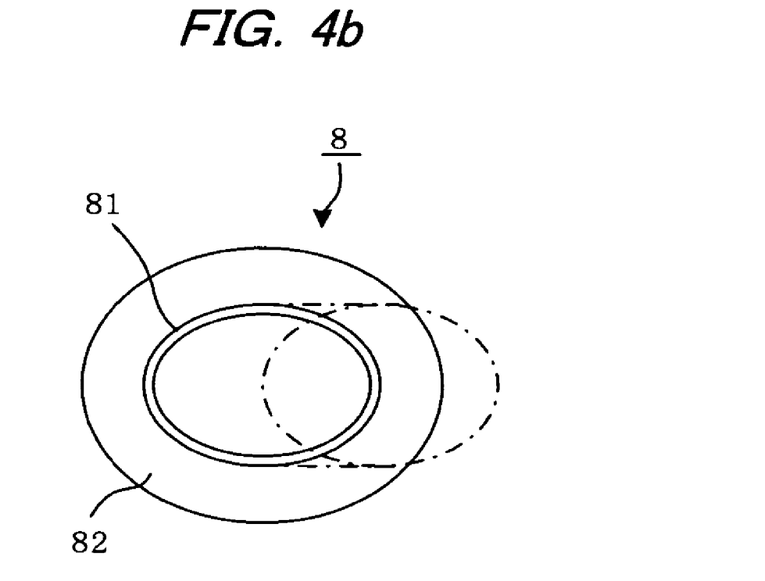
FIG. 4b is a top view showing the structure of a collar for the lining material used in the second embodiment.

A collar 8, as depicted in the side view and upper view of FIGS. 4a and 4b, is adapted for use. The entirety of the collar 8 is formed from a metal, such as stainless steel, and comprises a short tubular part 81 that is mated with the end part of the lining material 3 on the flanges 4, 4' side, and a flange part 82 that is formed around the outer circumference of one end part (the rear end part) of this tubular part 81 and is stacked and fixed to the lower surface of the flange 4'. The tubular part 81 has a shape corresponding to the shape of the pipe opening of the branch pipe 2 measured by the pre-examination; in the present embodiment, it is shaped as an elliptical tube, and its outer diameter (the lengths of the long axis and the short axis) is the same as or slightly less than the elliptical inner diameter (the lengths of the long axis and the short axis) of the opening of the lining material 3 at the pipe opening of the branch pipe 2 when the lining material 3 has been shaped as a tubular shape by bringing it into pressure contact with the inner circumferential surface of the branch pipe 2. The flange part 82 is also elliptical in the present embodiment, having a shape corresponding to the shape of the flange fixing surface measured by the pre-examination, and is curvedly formed with a curvature the same as the curvature of the measured flange fixing surface.

Furthermore, the portion of the tube part 81 outside of the end part on the flange part 82 side indicated by the symbol 81a, i.e., the majority part on the tip side of the flange part 82, is formed in a coil shape, and this coil shaped portion 81a has an angle with respect to the flange part 82 (the axial angle of the coil shaped portion 81a relative the surface direction of the flange) that varies by the elastic deformation of the coil shaped portion 81a, as shown, for example, by the chain line. In the initial state when no external force is applied to the coil shaped portion 81a, that angle is a perpendicular 90 degrees, as shown in the figure. However, the angle in this initial state is not limited to 90 degrees.

At the start of the lining work, the collar 8 is first set on the pipe opening attachment 6, and the flange 4' is stacked on the flange 82 of the collar 8. The end part of the lining material 3 on the cut pieces 3a side is then passed through the collar 8 and the cut pieces 3a are folded back and stacked on the flange 4'. The flange 4 is then stacked on the flange 4' and the cut pieces 3a thereon.

Subsequently, the pipe opening attachment 6 is raised at a position directly below the pipe opening of the branch pipe 2 to bring the flanges 4, 4', the cut pieces 3a, and the flange part 82 of the collar 8 stacked on the pipe opening attachment 6 into pressure contact with the flange fixing surface surrounding the pipe opening. At this time, the coil shaped portion 81a inserted into the pipe opening is pressed in the right direction in FIG. 3 and FIG. 4 by the inner circumferential surface of the inclined branch pipe 2, elastically modified in the right direction as shown by the chain line so that the angle of the coil shaped portion 81a in the axial direction with respect to the flange part 82 in the surface direction is matched to the angle of intersection of the main pipe 1 with the branch pipe 2, thereby enabling the smooth insertion of the coil shaped portion 81a into the pipe opening of the branch pipe 2 along with the end part of the lining material 3.

After insertion and bringing into pressure contact in this manner, the lining material 3 is everted and inserted into the branch pipe 2 by air pressure or water pressure, as previously discussed, then brought into pressure contact with the inner circumferential surface of the branch pipe 2, after which the liquid setting resin of the lining material 3 and the flanges 4, 4' is cured by hot water, and the like, thereby completing the lining of the branch pipe 2. At this time, the flange part 82 of the collar 8 is bonded to the lower surface of the flange 4' by the cured liquid setting resin, and the collar 8 is fixed by the bonding of the coil shaped portion 81a of the tube part 81 to the end part of the lining material 3.

According to the present embodiment, the angle of the coil shaped portion 81a of the collar 8 with respect to the flange part 82 is variable, and can be matched to the angle of intersection of the main pipe 1 with the branch pipe 2; therefore, even if this is affixed to the end part of the lining material 3 on the side of the flanges 4, 4', the angle formed by the end part of the lining material 3 with the flanges 4, 4' is not influenced by the collar, and can be matched to the angle of intersection of the main pipe 1 with the branch pipe 2, thereby enabling the flanges 4, 4' to be tightly sealed and fixed to the entire surface of the flange fixing surface. Accordingly, the gap between the inner circumference of the branch pipe 2 and the outer circumference of the lining material 3 at the circumferential edge part of the pipe opening of the branch pipe 2 can be completely sealed by the flanges 4, 4', thus enabling the reliable prevention of the infiltration of external ground water, rainwater, and the like. Therefore, when a pass-through hole is formed in the lining material of the main pipe 1 at the portion opposing the pipe opening of the branch pipe 2, the end part of the lining material of the branch pipe 2 can be protected from the cutting blades of the drill by the collar 8.

In the above mentioned embodiment, there are gaps between adjoining cut pieces 3a. which cause holes smaller than the above mentioned gap to be unfortunately formed in the integrally hardened flanges 4, 4' and lining material 3. A short tubular element or member 9 as shown in FIG. 5 overcomes such a disadvantage.

The short tubular member 9 comprises a flexible resin absorber impregnated with a liquid setting resin the same as the lining material 3, has a diameter the same as the lining material 3, is formed in a short tubular shape at an angular inclination corresponding to the pre-measured angle of intersection of the main pipe 1 with the branch pipe 2, and one end side is likewise radially expanded to form a plurality of cut pieces 9a. The opening on the side of the cut pieces 9a is shaped the same as the opening on the side of the cut pieces 3a of the lining material 3, and, although not illustrated in detail, is formed in an elliptical shape with a curvature corresponding to the flange fixing surface. In addition, the cut pieces 9a of the short tubular member 9 is the same in number as the cut pieces 3a of the lining material 3, and the phase of their radial arrangement is shifted, alternating with the cut pieces 3a, and can thereby be stacked with the cut pieces 3a so that the gaps between adjacent cut pieces 3a are plugged.

Figure 5:
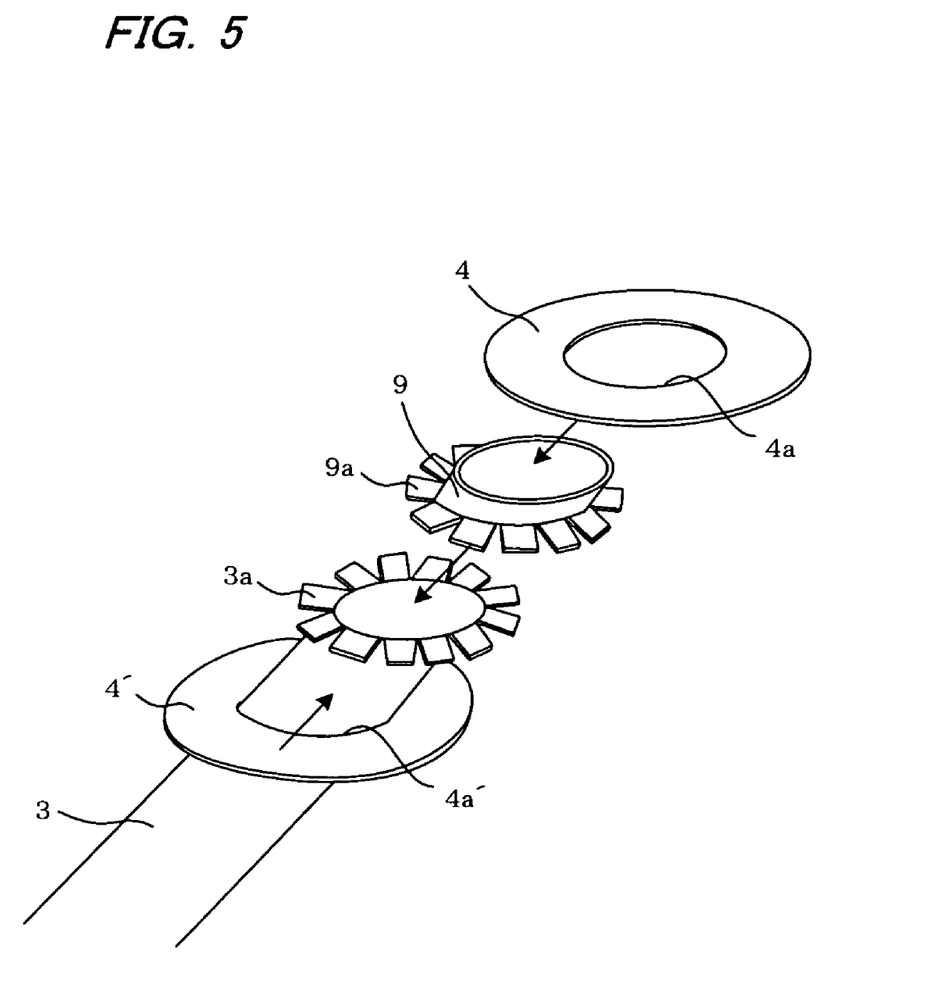
FIG. 5 is a perspective view showing how the end part of the lining material is mounted on flanges and a short tubular member used in the lining of the branch pipe in the third embodiment.

Such a short tubular member 9 is inserted between the flange 4 and the end part of the lining material 3 on the side of the cut pieces 3a, as shown in FIG. 5, and is positioned so that the cut pieces 9a of the short tubular member 9 exist in each of the gaps between the adjacent cut pieces 3a of the lining material 3. Furthermore, the tubular part of the short tubular member 9 is passed through the hole 4a of the flange 4, the flange 4 is stacked on each of the cut pieces 9a, and the flange 4' is stacked below each of the cut pieces 3a.

Subsequently, these stacked objects are brought into pressure contact with the flange fixing surface surrounding the pipe opening of the branch pipe 2, as previously discussed, and the lining material 3 is everted and inserted into the branch pipe 2 and brought into pressure contact with the inner circumferential surface of the branch pipe 2. The liquid setting resin impregnated in each of the lining material 3, the flanges 4, 4', and the short tubular member 9 are then cured to line branch pipe 2. At this time, the cut pieces 3a and 9a are mutually bonded as well as bonded to the flanges 4, 4' by the cured liquid setting resin.

According to the present embodiment, each of the gaps between mutually adjoining cut pieces 3a of the lining material 3 are plugged by each of the cut pieces 9a of the short tubular member 9, and therefore, even if the opening of the end part of the lining material 3 on the side of the cut pieces 3a is somewhat positionally deviated from the holes 4a, 4a' of the flanges 4, 4', the lining material 3, the flanges 4, 4', and the short tubular member 9 are made an integrally hardened object, and there is no formation of holes by the abovementioned gaps. Accordingly, a perfect seal can be made by the flanges 4, 4' at the circumferential edge part of the pipe opening of the branch pipe 2.

What is claimed is:

1. A method for lining an existing pipe using a tubular lining material comprising a flexible resin absorber impregnated therein with a liquid setting resin, comprising the steps of:
    radially spreading one end part of the lining material to form a plurality of cut pieces;
    laying the cut pieces of the lining material on a flange comprising a flexible resin absorber impregnated with a liquid setting resin;
    bringing the flange and the cut pieces of the lining material into pressure contact with a surface surrounding a pipe opening of the existing pipe; and
    curing the liquid setting resin in the flange and the cut pieces of the lining material to adhesively fix the flange and the cut pieces of the lining material to the surface surrounding the pipe opening of the existing pipe.

2. A method for lining an existing pipe according to claim 1; further comprising the steps of evertedly inserting the lining material into the existing pipe after the bringing step and thereafter curing the liquid setting resin in the lining material inserted into the existing pipe substantially at the same time the liquid setting resin in the flange and in the cut pieces of the lining material is cured.

3. A method for lining an existing pipe according to claim 1; wherein the flange comprises a first flange; and wherein the laying step further comprises the step of disposing a second flange over the cut pieces of the lining material to interpose the cut pieces of the lining material between the first and second flanges; and wherein the bringing step further comprises the step of bringing the first and second flanges and the cut pieces of the lining material into pressure contact with the surface surrounding the pipe opening of the existing pipe.

4. A method of lining an existing pipe according to claim 1; wherein the radially spreading step comprises the step of radially spreading the end part of the lining material to form the plurality of cut pieces with craps between mutually adjacent cut pieces; and further comprising the steps of providing a short tubular member made of a flexible resin absorber impregnated with a liquid setting resin and having a diameter substantially the same as that of the lining material and one end side radially spread and forming a plurality of cut pieces, and joining the short tubular member to the lining material so that the cut pieces of the short tubular member plug the respective gaps between the mutually adjacent cut pieces of the lining material.

5. A method for lining an existing pipe according to claim 1; further comprising the step of inserting an elastically deformable collar into the lining material to protect the lining material from being damaged.

6. A method for lining an existing pipe according to claim 1; wherein the existing pipe comprises a branch pipe intersecting with a main pipe; and wherein the bringing step further comprises the step moving the flange on which the cut pieces of the lining material are laid through the main pipe and bringing the flange and the cut pieces of the lining material into pressure contact with the surface surrounding the pipe opening of the branch pipe.

7. A method for lining an existing pipe according to claim 1; further including, after the bringing step and before or after the curing step, the step of evertedly inserting the lining material into the existing pipe.

8. In combination: a lining material for lining an existing pipe; a flange separate and independent from the existing pipe and the lining material and integrally connected to an end part of the lining material; and a collar for protecting the lining material during use to line the existing pipe, the collar having an elastically deformable tubular part mated to an interior surface of the lining material, and a flange part extending from one end of the tubular part and stacked with and integrally connected to the flange.

9. A method for lining a branch pipe intersecting with a main pipe, the method comprising the steps of:
providing a liner comprised of a tubular body made of a flexible resin absorbing material impregnated with a liquid setting resin;
radially spreading an end part of the tubular body to form a plurality of cut pieces;
disposing the cut pieces of the tubular body on a surface of a flange made of a flexible resin absorbing material impregnated with a liquid setting resin;
moving the flange and the tubular body within the main pipe and bringing the flange and the cut pieces of the tubular body into pressure contact with a surface surrounding an opening of the branch pipe;
inserting the tubular body into the branch pipe through the opening thereof by everting the tubular body from the end part having the cut pieces; and
curing the liquid setting resin in the flexible resin absorbing material of the flange and the tubular body, including the cut pieces at the end part of the tubular body, to adhesively fix the tubular body to inner wall surfaces of the branch pipe and adhesively fix the flange and the cut pieces of the tubular body to the surface surrounding the opening of the branch pipe.

10. A method according to claim 9; further comprising the step of inserting the end part of the tubular body through a through-hole of the flange prior to disposing the cut pieces of the tubular body on the surface of the flange.

11. A method according to claim 9; wherein the radially spreading step comprises radially spreading the end part of the tubular body to form a plurality of cut pieces with gaps between mutually adjacent cut pieces; and further comprising the steps of providing a tubular element made of a flexible resin absorber impregnated with a liquid setting resin and having a diameter substantially the same as that of the lining material and one end side radially spread and forming a plurality of cut pieces; and joining the tubular element to the tubular body so that the cut pieces of the tubular element plug the respective gaps between the mutually adjacent cut pieces of the tubular body.

12. A method according to claim 11; wherein the flange comprises a first flange; and wherein the disposing step comprises disposing a second flange over the first flange so that the cut pieces of the tubular body and the cut pieces of the tubular element are interposed between the first and second flanges, the second flange being made of a flexible resin absorbing material impregnated with a liquid setting resin.

13. A method according to claim 12; wherein the moving step comprises moving the first and second flanges, the tubular element, and the tubular body within the main pipe and bringing the first and second flanges, the tubular element, and the cut pieces of the tubular body into pressure contact with the surface surrounding the opening of the branch pipe.

14. A method according to claim 13; wherein the curing step comprises simultaneously curing the liquid setting resin in the flexible resin absorbing material of the first flange, the second flange, the tubular element, and the tubular body, including the cut pieces at the end part of the tubular body, to adhesively fix the tubular element and the tubular body to the inner wall surfaces of the branch pipe and adhesively fix the first and second flanges and the cut pieces of the tubular body to the surface surrounding the opening of the branch pipe.

15. A method according to claim 9; wherein the flange comprises a first flange; and wherein the disposing step comprises disposing a second flange over the first flange so that the cut pieces of the tubular body are interposed between the first and second flanges.

16. A method according to claim 15; wherein the moving step comprises moving the first and second flanges and the tubular body within the main pipe and bringing the first and second flanges and the cut pieces of the tubular body into pressure contact with the surface surrounding the opening of the branch pipe.

17. A method according to claim 16; wherein the curing step comprises simultaneously curing the liquid setting resin in the flexible resin absorbing material of the first flange, the second flange and the tubular body, including the cut pieces at the end part of the tubular body, to adhesively fix the tubular body to the inner wall surfaces of the branch pipe and adhesively fix the first and second flanges and the cut pieces of the tubular body to the surface surrounding the opening of the branch pipe.

18. A method according to claim 9; further comprising the step of inserting an elastically deformable collar into the tubular body to protect the tubular body from being damaged.

* * * * *